United States Patent [19]

Weppler

[11] Patent Number: 4,750,150
[45] Date of Patent: Jun. 7, 1988

[54] I/O SCANNER FOR AN INDUSTRIAL CONTROL

[75] Inventor: Robert C. Weppler, Warrensville Heights, Ohio

[73] Assignee: Allen-Bradley Company, Inc., Milwaukee, Wis.

[21] Appl. No.: 890,126

[22] Filed: Jul. 28, 1986

Related U.S. Application Data

[63] Continuation-in-part of Ser. No. 624,383, Jun. 25, 1984, Pat. No. 4,630,233.

[51] Int. Cl.$^4$ .............................................. G06F 15/46
[52] U.S. Cl. ................................................... 364/900
[58] Field of Search ... 364/200 MS File, 900 MS File, 364/137, 183

[56] References Cited

U.S. PATENT DOCUMENTS

| | | | |
|---|---|---|---|
| 3,982,230 | 9/1976 | Burkett et al. | |
| 4,038,533 | 7/1977 | Dummermuth et al. | 364/900 X |
| 4,151,589 | 4/1979 | Ross | 364/137 |
| 4,254,473 | 3/1981 | Galdun et al. | 364/900 |
| 4,354,226 | 10/1982 | Flickinger et al. | 364/900 X |
| 4,404,651 | 9/1983 | Grudowski | 364/900 |
| 4,477,882 | 10/1984 | Schumacher et al. | 364/900 |

Primary Examiner—Thomas M. Heckler
Attorney, Agent, or Firm—Quarles & Brady

[57] ABSTRACT

The I/O modules for an industrial control processor are connected together in a serial I/O ring. The processor performs an I/O scan sequence in which output data for the I/O modules is shifted serially from an output image table onto the I/O ring and input data from the I/O modules is pushed around the I/O ring and into the processor where it updates an input image table. Each I/O module can be configured to perform digital filtering and input pulse catching on the inputs and to enable a watchdog timer. Configuration data is sent out from the processor like output data and is latched into a configuration latch in the I/O module by a configure command from the processor.

9 Claims, 9 Drawing Sheets

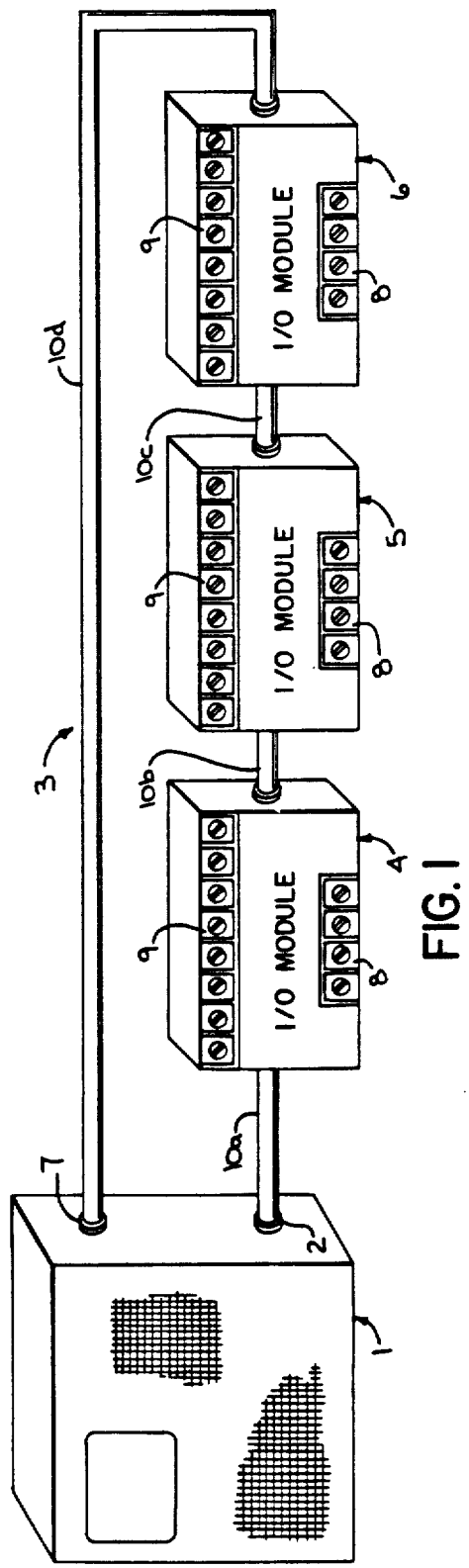
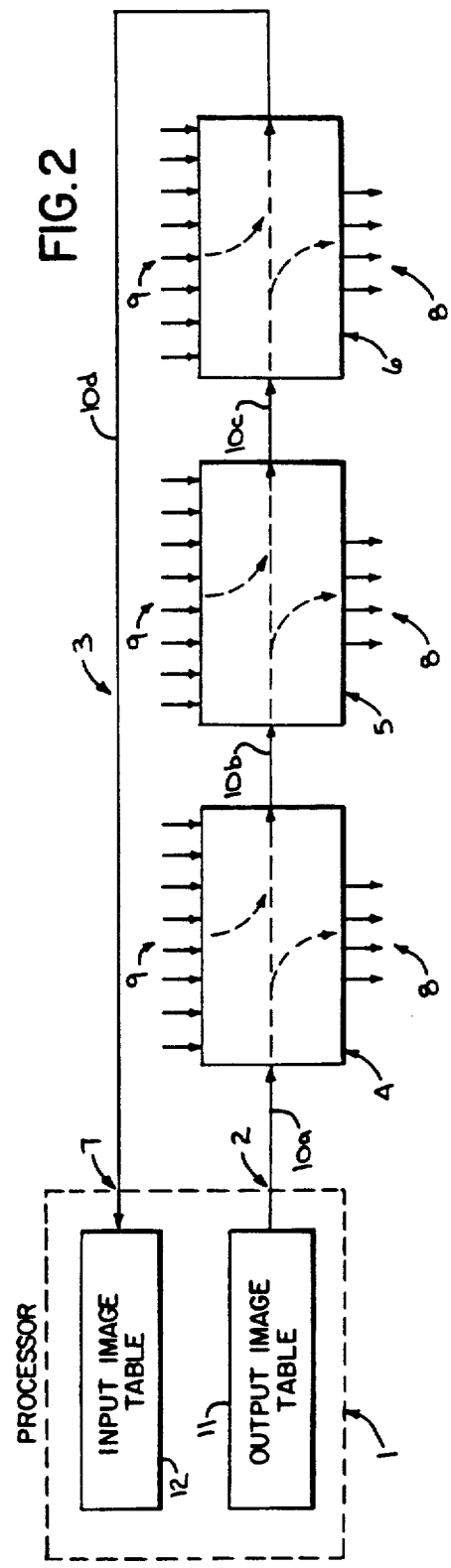
FIG. 1
FIG. 2

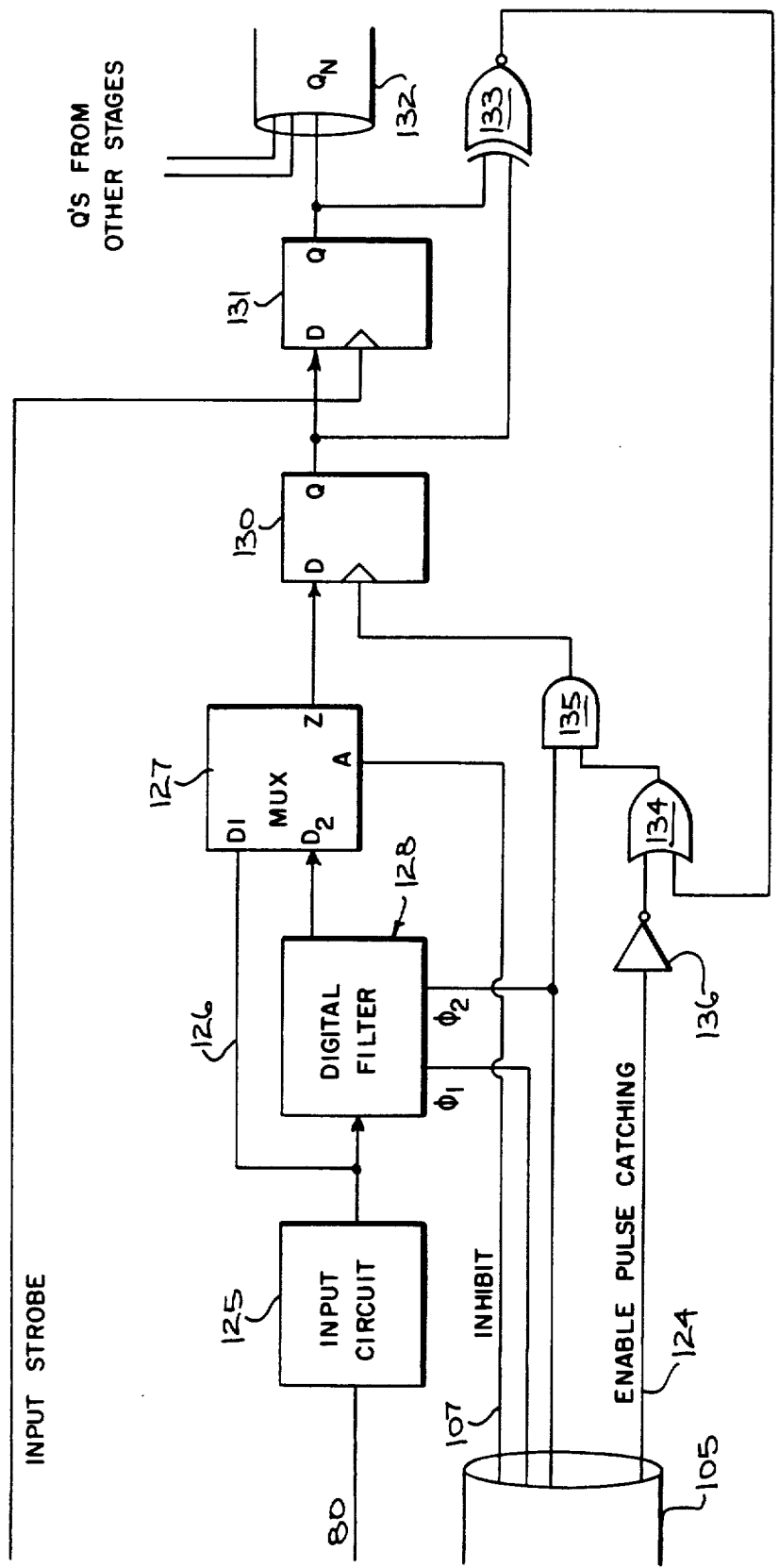
FIG. 10   Nth STAGE - INPUT FILTER AND LATCH

I/O SCANNER FOR AN INDUSTRIAL CONTROL

CROSS REFERENCE

This application is a continuation-in-part of U.S. patent application Ser. No. 624,383 filed on June 25, 1984, now U.S. Pat. No. 4,630,233.

BACKGROUND OF THE INVENTION

The field of the invention is industrial control systems, such as numerical controls, programmable controllers and process controls which are connected to numerous sensing devices and operating devices in the factory environment.

In numerical controls such as those disclosed in U.S. Pat. Nos. 4,038,533 and 4,228,495 and in programmable controllers such as those disclosed in U.S. Pat. Nos. 4,266,281 and 3,982,230, a processor operates to input data from sensors, perform calculations and output data to operating devices. While some input/output (I/O) data may be directly operated upon by the processor, it is common practice to operate on I/O data contained in an I/O image table which is created in the processor's memory. In such systems an I/O scan is periodically performed to update the state of the input image table with the current status of the sensing devices connected to the machine, and to write the output image table to corresponding operating devices connected to the machine.

There are numerous methods presently used to perform the periodic I/O scan. In U.S. Pat. No. 4,038,533 the numerical control processor is periodically interrupted from its other functions to perform the I/O scan itself. In U.S. Pat. No. 4,228,495 a separate "programmable interface" processor which couples to the main processor performs a number of I/O functions, including the periodic I/O scan. And finally, in U.S. Pat. No. 3,842,158 a separate input/output "scanner" circuit is provided to perform the I/O scan on a continuous basis by periodically "stealing" access time to the I/O image table from the main processor.

There are also a variety of architectures used for the I/O interface circuitry. The most common structures employ a set of I/O modules which are mounted in an I/O rack such as those disclosed in U.S. Pat. Nos. 3,992,684; 4,151,580 and 4,152,750. The I/O rack may also house the processor as in U.S. Pat. Nos. 4,294,924 and 4,263,647, or the I/O rack may be physically separate from the processor as in U.S. Pat. Nos. 3,997,879, 3,982,230 and 4,258,563. When the I/O modules are located in the same rack with the processor, they usually share a common backplane bus structure in which I/O data is conveyed in parallel. On the other hand, when the I/O racks are physically separate from the processor, the usual practice is to convey I/O data serially to reduce the cost of the electrical interconnection. Such serial communications usually involve a complex protocol that reduces the efficiency of the I/O data link and increases the cost.

Several advanced features are known for enhancing the integrity of input data, including digital filtering and pulse catching. However, such features are not always desired and therefore require control and the specification of operating parameters, for example the clock frequency to be used in digital filtering. In prior remote I/O modules which processed only I/O data, such control and specification of advanced features was not possible.

SUMMARY OF THE INVENTION

The present invention is an I/O structure for an industrial processor which provides efficient, cost-effective coupling of I/O data between a processor and separate I/O modules. More specifically, the invention includes one or more I/O modules connected in a serial I/O ring with a processor, each I/O module including a serial input port for receiving serial data on the ring, a serial output port for transmitting data on the ring, input means for receiving input data from sensing devices connected to the I/O module, output means for applying output data to operating devices connected to the I/O module, a temporary storage latch for holding data in the I/O module, and control means for directing the flow of data through the I/O module.

The processor maintains an output image table and an input image table. The processor sends out a series of data packets, each data packet representing an entry from the output image table. After sending the series of data packets, the processor sends out an update command packet, commmanding each I/O module to latch the I/O data previously sent onto a set of output terminals. At each I/O module, when the first data packet is received, input data at a set of input terminals is latched into an input latch and the contents of the input latch are directed to the serial output port thereby pushing the input data around the I/O ring. The first data packet is directed to the temporary storage latch. When the second and subsequent data packets are received, the contents of the temporary storage latch are directed to the serial output port and the received data packet is directed to the temporary storage latch. In this way, the data is circulated through the I/O module and advanced from module to module. The input data from each I/O module is advanced around the ring until it is received at the processor. When the update command packet is received at each I/O module, the contents of the temporary storage latch are directed to an output latch for applying the output data to the output terminals, and the update command packet is directed to the serial output port for forwarding to the next module.

A general object of the invention is to provide an efficient I/O data transfer system for an industrial processor. The elements of the I/O ring are linked together by a serial data link, and this substantially reduces the cost of linking I/O modules which are physically separated. The communications protocol is simplified considerably by using the ring configuration and an I/O scan sequence which does not require address data.

Another object of the invention is to provide a serial I/O system in which the I/O scan may be executed quickly. This is accomplished in part by the minimal protocol overhead, and in part by the use of a ring configuration. As output data is placed on the serial I/O ring through a serial output port on the processor, input data is received substantially concurrently from the serial I/O ring. This concurrent I/O scan is much quicker than prior techniques in which a separate output scan and then an input scan of the I/O data are performed.

A further object of the invention is to configure each I/O module for the control of input processing features. The processor sends out configuration data onto the I/O ring in the same manner as output data. After sending the configuration data, the processor sends out a configure command onto the logical ring. Upon receipt of the configure command each I/O module latches the configuration data into a configuration latch. Each bit in the configuration latch controls an input processing feature within the I/O module, such as, for example, digital filtering of the inputs, input pulse catching, or a watchdog timer. The present invention thereby provides the ability to selectively configure each I/O module with the particular functionality best suited for the application which it is performing.

Still another object of the invention is to provide an I/O ring using redundant output data to enable error detection. Each packet of output data is sent out twice by the processor and each I/O module contains a second temporary storage latch, a second input latch, and comparator means. The second temporary storage latch stores the redundant data packet and the comparator means produces an error signal if the first data packet and the redundant data packet disagree. If an error is detected, the output data is discarded and an error flag is set in the command packet before the command packet is sent to the serial output port. The second input latch provides a second input data packet which is directed to the serial output port while the redundant output packet is being circulated through the I/O module. The redundant data and error detection are used for both I/O image table data and configuration data.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is a pictorial view of a processor connected to a series of I/O modules according to the present invention;

FIG. 2 is a schematic diagram showing the flow of I/O data in the system of FIG. 1;

FIG. 10 is an electrical schematic diagram of one stage of the input filter and latch circuit of FIG. 3.

DESCRIPTION OF THE PREFERRED EMBODIMENT

Figure 3:
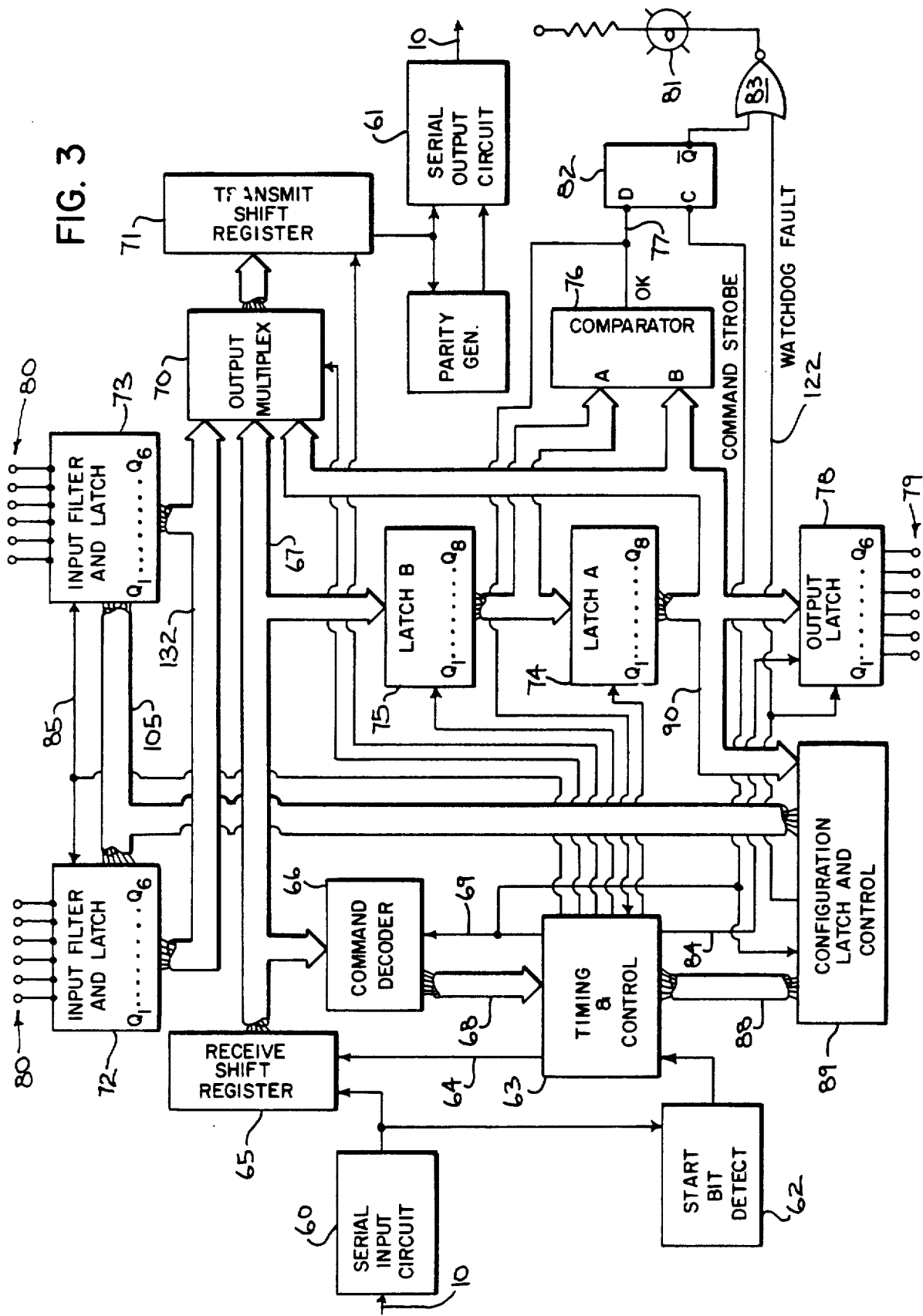
FIG. 3 is an electrical schematic diagram of the I/O modules of FIG. 1.

Referring particularly to FIGS. 1 and 2, a processor 1 has a serial output port 2 which connects to a communications ring indicated generally at 8. The communications ring is comprised of three I/O modules 4, 5 and 6 which connect in series to the processor's serial output port 2 and which connect to a serial input port 7 on the processor 1. As will be explained in detail below, data is output serially through the output port 2, shifted through the I/O modules 4, 5 and 6, and into the serial input port 7.

Each I/O module 4, 5 and 6 includes a set of output terminals 8 which may be connected to operating devices such as lamps, motor drives, solenoids and alarms. Each I/O module 4, 5 and 6 also includes a set of input terminals 9 which may be connected to sensing devices such as manual switches, pressure sensors, light sensors, proximity switches, and limit switches. The communication link 10 which connects the elements of the ring 3 together may be a twisted wire pair, coaxial cable, optical fiber or other serial communication link media which is suitable for use in an industrial environment. The drivers and receivers at the ends of each link segment 10 are chosen to match the selected communications media. The lengths of each link segment 10 will vary depending on the particular application. For example, the I/O modules 4, 5 and 6 may be located in a separate cabinet from the processor 1, and in such case, the links 10a and 10d are relatively long and the links 10b and 10c are very short. It will become apparent from the description below that the present invention does not limit the number of I/O modules which may be employed in the ring 3, the number of I/O points which may reside at each module, or the choice of communications media which may be used in the ring 3.

Referring particularly to FIG. 2, the communications ring 3 is operated when the processor 1 performs an I/O scan to output data from its output image table 11 and to input data to its input image table 12. The I/O scan is performed by sequentially shifting the contents of the output image table 11 on to the ring 3. Concurrently, input data from each I/O module 4, 5 and 6 is inserted on the ring 3 and shifted into the input image table 12. Thus, when all of the output data has been shifted from the output image table 11, the input image table 12 has also been updated by input data returned through serial input port 7.

It is customary for an industrial control system to have approximately twice as many inputs as it has outputs. In this embodiment, therefore, each output is inserted onto the ring 3 twice; once as the regular output data and a second time with the 1's complement of the output data. Sending the output data twice serves two functions. First, it allows two input packets to be shifted into the input image table for each output packet and complement shifted onto the ring 3. Secondly, the complemented data serves as an error check on the output data. If the two output data packets are not exact complements, then an error has occurred and the data is discarded.

Figure 5A:
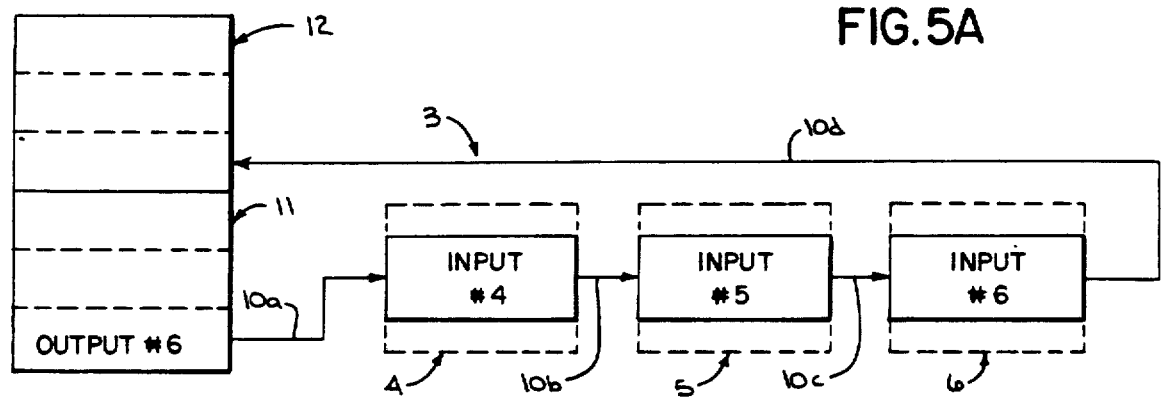
FIGS. 5A–5D are schematic diagrams used to illustrate data flow in the system of FIG. 1.
Figure 5B:
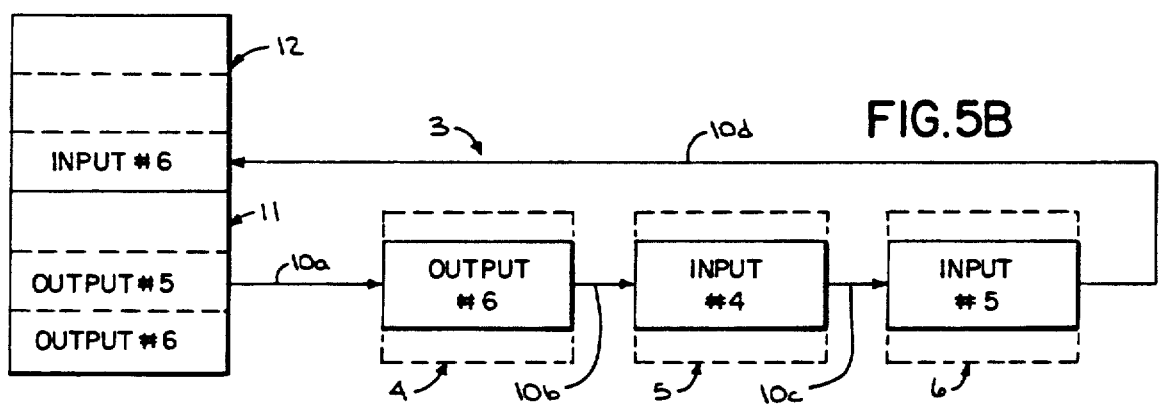

The essence of this I/O scan is illustrated in FIGS. 5A–5D. As shown in FIG. 5A, the first step in the I/O scan is for the processor 1 to set pointers to the last entries in both image tables 11 and 12. The output data for I/O module 6 is transmitted to I/O module 4 and the I/O scan advances to the state shown in FIG. 5B. The input data applied to module 4 is latched when it receives this output data.

The input data which was previously latched by I/O module 4 is shifted forward around the I/O ring 3, with the input data for the last I/O module 6 being deposited in the last entry of the input image table 12. The pointer for the output image table 11 is then advanced to the entry for I/O module 5, and the output data for I/O module 5 is output from the table 11 by the processor 1.

Figure 5C:
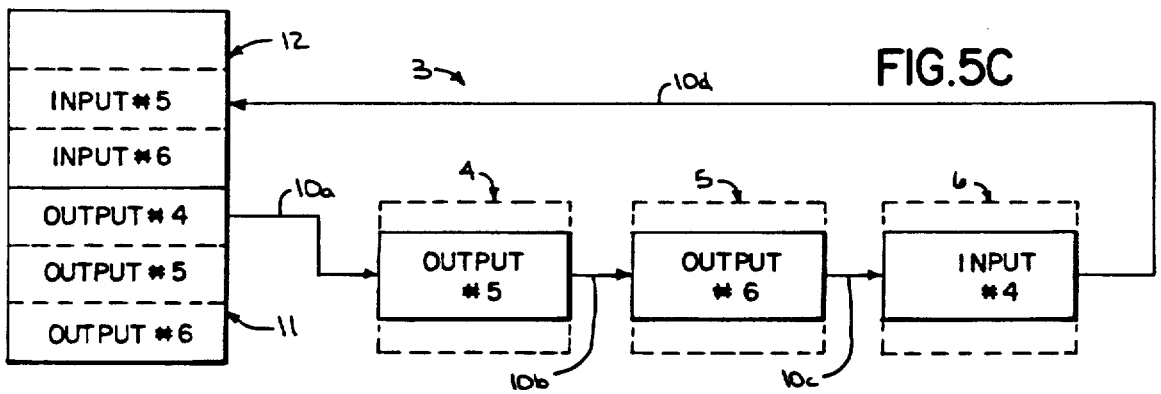
Figure 5D:
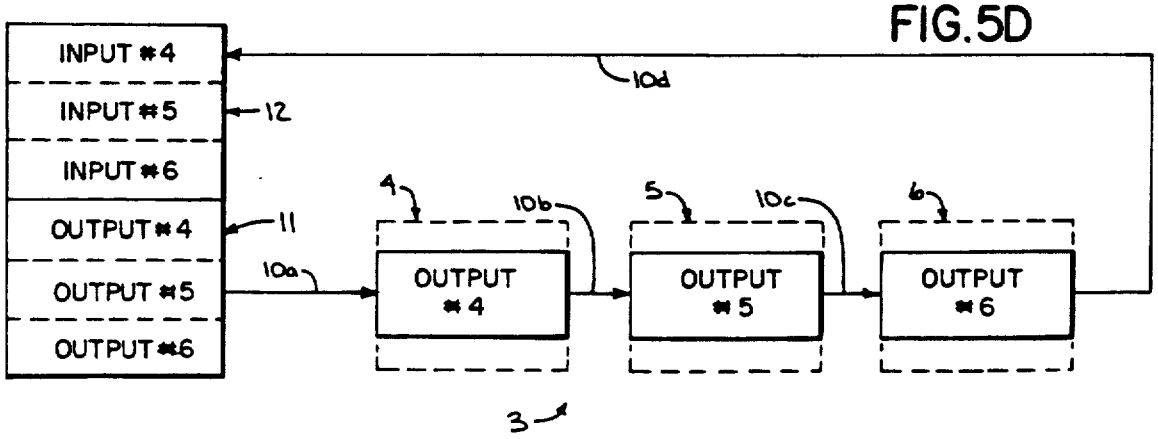

As shown in FIG. 5C, the I/O scan then advances to the next step in which the image table pointers are advanced to the next table entries and the data on the I/O ring 3 is shifted ahead. The input data for I/O module 5 is received by the processor 1 and this is written into the input image table 12. The last of the output data for I/O module 4 is then transmitted on the I/O ring 3 and the I/O scan advances to the state shown in FIG. 5D. Again, the data is shifted forward around the I/O ring 3 and the input data for I/O module 4 is received by the processor 1 and is written into the input image table 12. The processor 1 then transmits a "CHECK COMMAND" on the I/O ring 3 which is passed around the ring 3 by each I/O module 4–6. As each I/O module 4–6 receives this command, it checks the integrity of the output data which it receive during the scan. The CHECK COMMAND carries an error indication back to the processor 1 if a problem is detected. The processor 1 then transmits an "UPDATE COMMAND" on the I/O ring 3. As each I/O module 4–6 receives this comamnd, it again checks the integrity of the output data which it received during the scan. If this data is good, the data is latched and output to the I/O module's terminals 8. Receipt of the UPDATE COMMAND back from the I/O ring 3 signals the processor 1 that the I/O scan is complete and that another I/O scan can be started.

Each I/O module 4–6 has the capability of being configured with a set of control options. The options available are digital filtering of the inputs, input pulse catching, and a watchdog timer. These options are generally known in the art, but are not always desired in every application. Hence it is necessary to provide a control mechanism to selectively turn the desired options on and off. In the present invention, configuration data containing bits designated to control the available options is transmitted around the ring in the same manner as output image table data described above. The configuration data is maintained in a separate configuration table with a format similar to the output image table. After the configuration data has been sent around the ring, the processor 1 transmit a CONFIGURE COMMAND, which causes each I/O module 4–6 to latch the configuration data.

Figure 4:
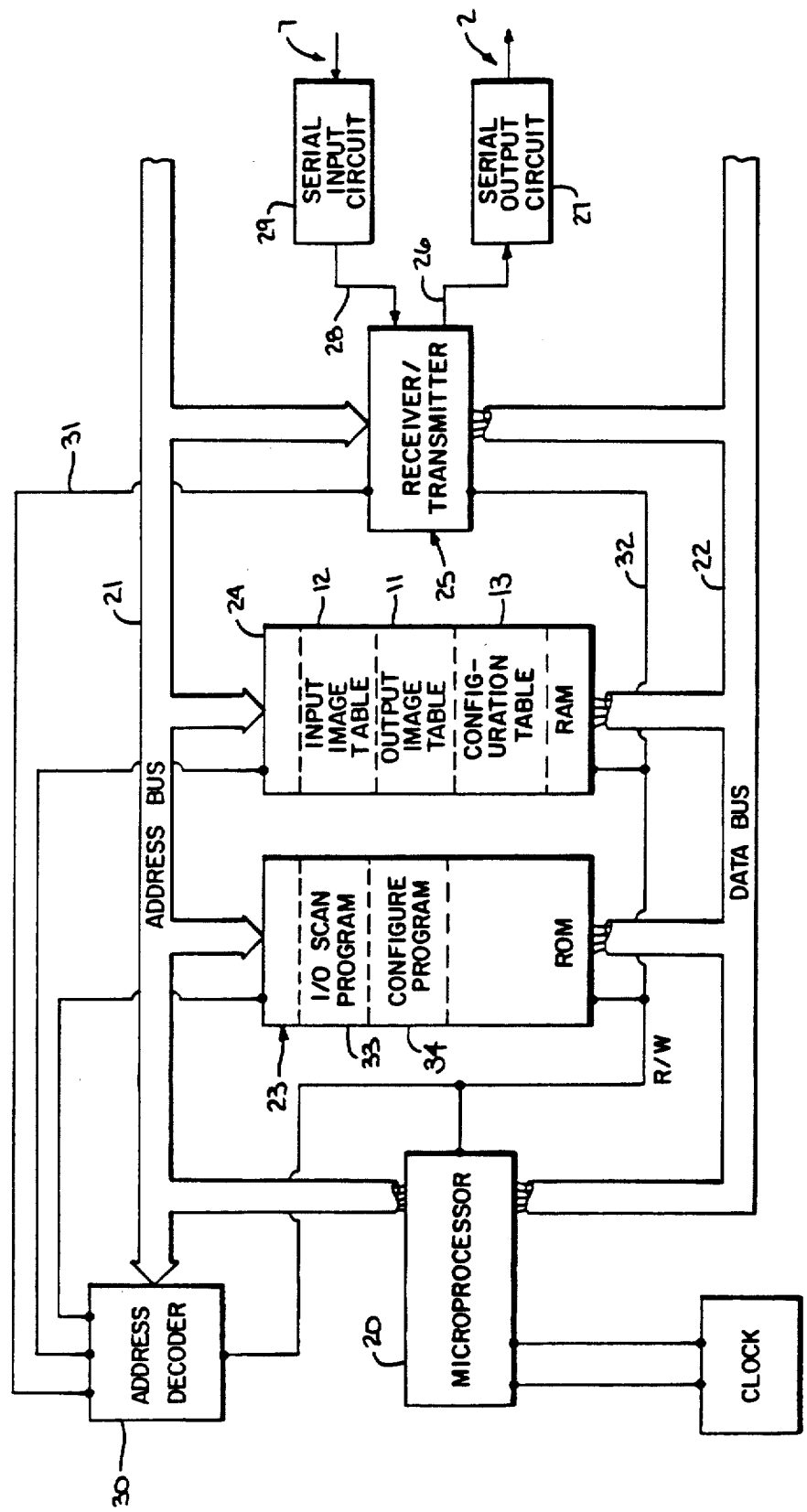
FIG. 4 is an electrical schematic diagram of the processor of FIG. 1.

Referring particularly to FIG. 4, the processor 1 is a microprocessor-based system which is structured about an 8-bit microprocessor 20 that drives an address bus 21 and a data bus 22. The microprocessor 20 operates in response to machine language program instructions which are read from a read-only memory (ROM) 23, and it operates a data which is stored in a random access memory (RAM) 24. In the preferred embodiment described herein the microprocessor 20 performs the programmable interface functions on a numerical control system such as that described in U.S. Pat. No. 4,228,495.

The I/O loop 3 is operated by the microprocessor 20 through a receiver/transmitter 25. The receiver/transmitter 25 has a serial output line 26 which drives the processor output port 2 through an appropriate serial output circuit 27. Similarly, the processor input port 7 is coupled to a serial input line 28 by a serial input circuit 29. The particular circuits chosen to connect with the I/O loop 3 will, of course, depend on the communications media which is chosen.

The receiver/transmitter 25 as well as the other elements in the processor 1 may be enabled when addressed by the microprocessor 20. The addresses which appear on the bus 21 are applied to an address decoder 30 that provides a chip enable signal to the system element being addressed. The receiver/transmitter 25 is thus enabled through control line 31, and data may be written to it or read from it through the data bus 22. A read/write control line 32 which is driven by the microprocessor 20 determines whether a read or a write operation is performed, and an address code from the address bus 21 selects the source or destination of data within the receiver/transmitter 25. For example, a status byte may be read from the receiver/transmitter 25 which indicates if a character has been received through input port 7 and if the transmit buffer is available to accept a character for transmission through serial output port 2. In addition, a character received from the I/O ring 3 may be read from the receiver/transmitter 25, and a character may be written to its transmit buffer for transmission on the I/O ring 3.

The input image table 12, the output image table 11, and the configuration table 13 are stored in the RAM 24 along with other data structures (not shown) required to carry out the programmable interface functions. In addition, an I/O scan program 33 and a configure program 34 are stored in the ROM 23. As will now be described in detail, the microprocessor 20 periodically executes the I/O scan program 33 to couple the data in the I/O image tables 11 and 12 with the sensing devices and operating devices connected to the I/O ring 3. The configure program is executed only when needed to configure the I/O ring 3, such as for example during power-on initialization.

Figure 6:
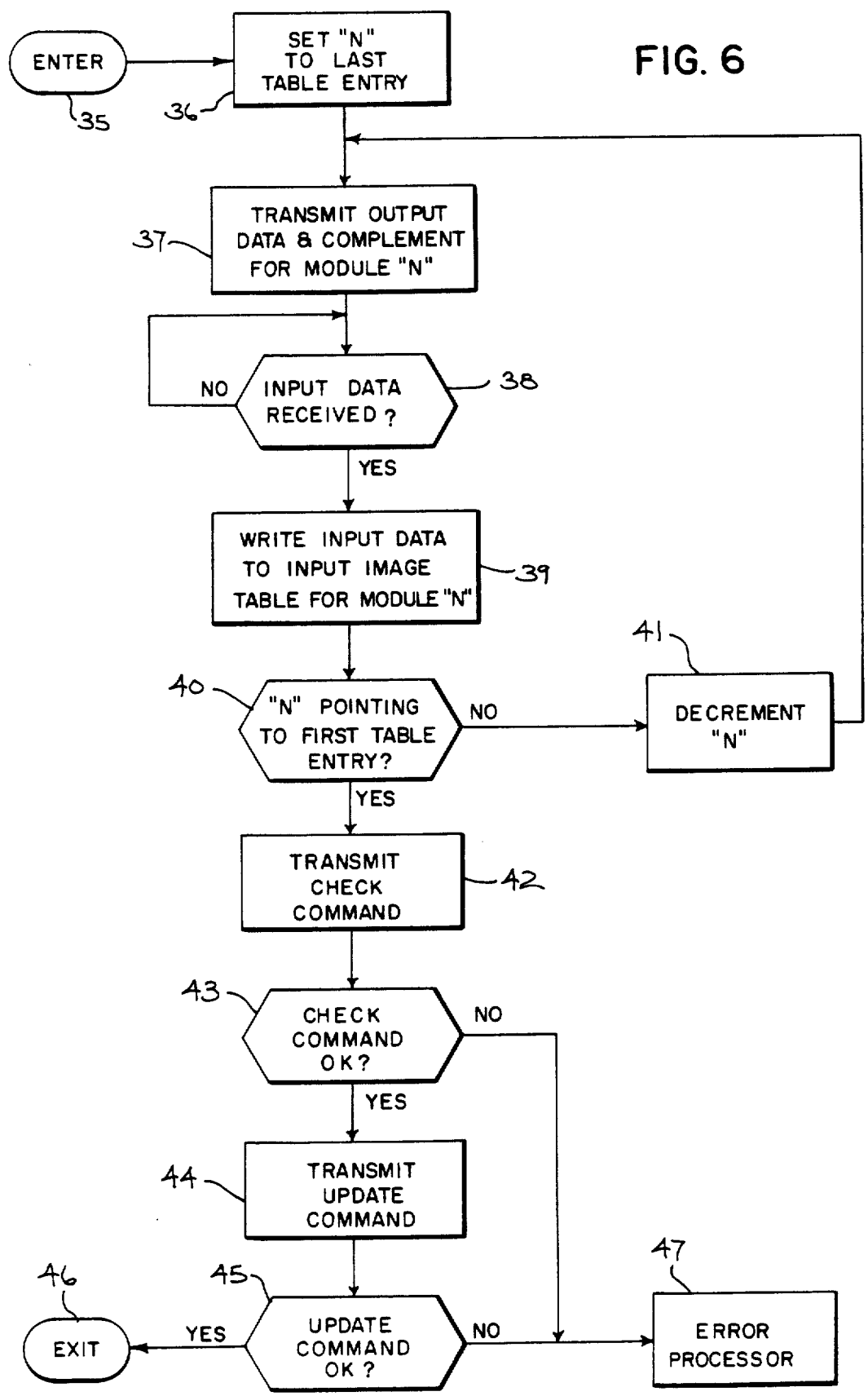
FIG. 6 is a flow chart of the I/O scan program which is executed by the processor of FIG. 1.

Referring particularly to FIG. 6, the I/O scan program 33 is entered at 35 each time the I/O image tables 11 and 12 are to be updated. The first step at process block 36 is to set a pointer "N" to point to the last table entry of both the input image table 12 and the output image table 11. Then at process block 37 the output data corresponding to module "N" is transmitted onto the ring 3, followed by a second data packet containing the complement of that output data. The insertion of the output data onto the ring 3 will cause all of the other stations in the ring to shift input data out. At decision block 38, a wait loop is entered until data has been shifted around the entire ring 3 and finally input back into the processor 1. Upon receiving the input data at process block 39 the input data is written into the input image table 11 at a location corresponding to module "N". At decision block 40, a test is made to see if the I/O scan has been completed as will be indicated when "N" is pointing to the first table entry for the input and output image tables 12 and 11. If "N" is not pointing to the first table entry, then control passes to process block 41 where "N" is decremented to point to the next table entry and control passes back to process block 37 for another interation of transmitting output data and receiving input data.

Figure 7A:
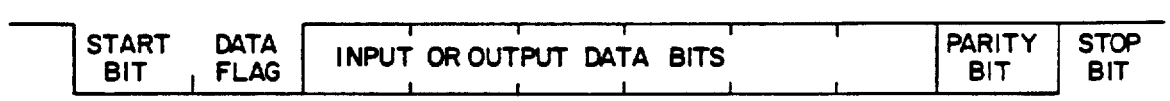
FIGS. 7A and 7B are schematic diagrams of data packets and command packets which are employed in the system of FIG. 1.
Figure 7B:
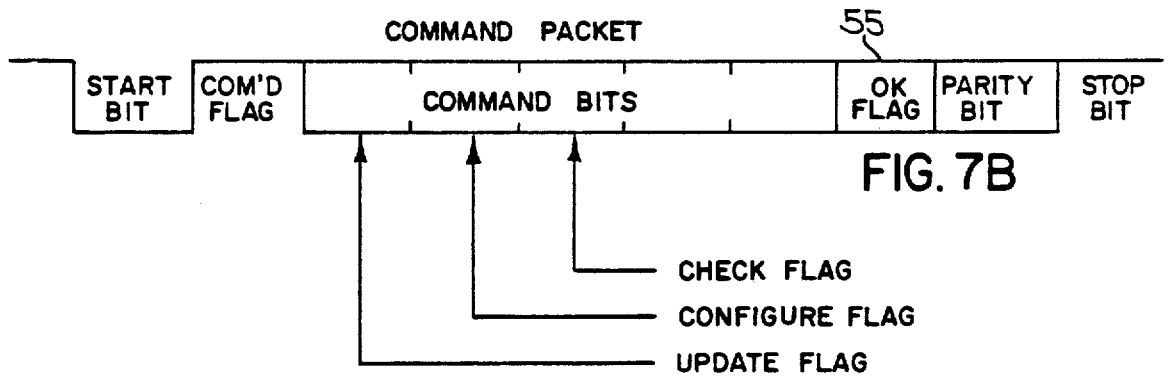

When "N" is finally pointing to the first table entry at decision block 40, then the I/O scan is complete and control transfers to process block 42. Referring to FIGS. 6 and 7B, at process block 42 a check command is transmitted onto the ring 3. The check command is one type of command packet with a format as shown in FIG. 7B. Each command packet includes an "OK" flag 55 which is used to indicate an error occuring on the ring 3. When a command packet is transmitted onto the ring 3, the OK flag is set. Each station performs the operation indicated in the command packet and transmits the command packet on to the next station. The command packet thus circulates around the entire ring 3 and is finally received back at the processor 1. If an error is detected by a station along the ring 3, then the OK flag 55 is reset before the command packet is propagated onward. In that case, when the command packet is received back at the processor 1 the OK flag will be reset and the processor 1 will thereby detect the occurrence of the error.

Referring again to FIG. 6 at decision block 43 a test is made to see if the check command was received with the OK flag 55 still set. If the OK flag 55 is set, then the CHECK COMMAND is ok and control transfers to process block 44. At process block 44 an UPDATE COMMAND is transmitted onto the ring 3, which causes each station to update its outputs with the data previously shifted onto the ring 3. A final check is made at decision block 45 to see if the update command was received back at the processor 1 with the OK flag 55 still set. If the update command was ok, then the I/O scan is complete and exit 46 is taken. If a command packet arrives back at the processor 1 with the OK flag 55 reset at either decision block 43 or decision block 45, then an error has occurred on the ring, and control passes to process block 47 to process the error.

Figure 8:
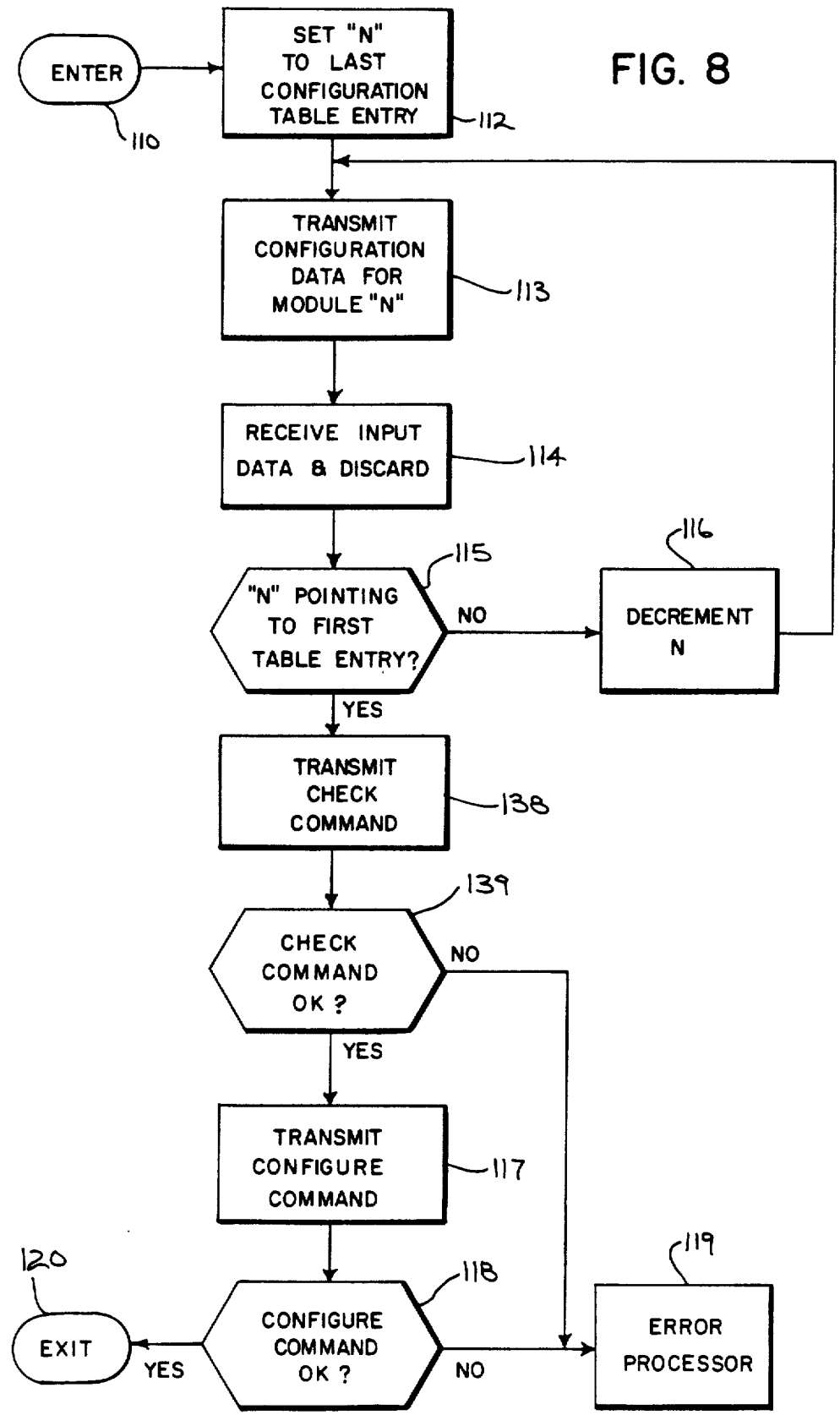
FIG. 8 is a flow chart of the configure program which is executed by the processor of FIG. 1.

Referring to FIG. 8, the configure program 34 is entered at 110 whenever it is necessary to configure the I/O ring 3. Processing begins at process block 112 where a pointer "N" is set to point to the last entry in the configuration table 13. Then at process block 113, the configuration data pointed to by "N" is transmitted onto the I/O ring 3 followed by a second data packet containing the complement of the configuration data. At process block 114, since configuration is an output only process, when the intput data packets are received as a result of pushing data onto the I/O ring 3, the input data is received and discarded. Processing continues at decision block 115 where the pointer "N" is tested to see if it is pointed to the first table entry. If "N" is not pointing to the first table entry, then the configuration process is not complete and control transfers to process block 116. At process block 116 "N" is decremented and a branch is taken back to process block 113 to transmit configuration data for another I/O module. If at decision block 115 "N" is pointing to the first table entry in the configuration table 13, then control transfers to process block 117. At this point, the configuration data has been transmitted around the loop and is being stored in each I/O module. A CHECK COMMAND is then transmitted around the loop at process block 138. The CHECK COMMAND causes each I/O module to verify the integrity of the configuration data in the same manner as output data. If any error is found in the configuration data, the OK flag 55 in the CHECK COMMAND is reset by the I/O module detecting the error. The CHECK COMMAND is tested at decision block 139 and a branch is taken to an error processor 119 if the OK flag 55 has been reset. If the check command is OK, the processing continues at process block 117.

At process block 117 a CONFIGURE COMMAND is transmitted onto the I/O ring 3 which causes each I/O module to latch in the data just sent as new configuration data. Then at decision block 118 when the CONFIGURE COMMAND returns from traversing the I/O ring 3 the OK Flag 55 from the CONFIGURE COMMAND is tested. If the OK Flag 55 has been reset, then an error has occurred on the I/O ring 3 and control passes to process block 119 to process the error. If at decision block 118 however, the OK Flag 55 is still set, then the CONFIGURE COMMAND was successful and the configuration program exits at 120.

While the I/O modules 4, 5 and 6 can be constructed using a variety of commerically available integrated circuits, in the preferred embodiment, a "state machine" is constructed using a custom integrated circuit. The circuit diagram for each I/O module 4-6 is shown in FIG. 3, where the serial input circuit 60 and the serial output circuit 61 are chosen to match the particular serial communication link 10 chosen. For example, if a fiber optic link 10 is used, the serial input circuit 60 may take the form of an optical receiver such as the model HFBR-2502 from Hewlett Packard Company, and the serial output circuit 61 may take the form of an optical transmitter such as the model HFBR-1502 from Hewlett Packard Company.

The information received and transmitted on the serial link 10 is comprised of 10-bit packets. Referring particularly to FIGS. 7A and 7B, the first bit in each packet is a "start" bit and the last bit is a "stop" bit. The second bit in each packet indicates whether the packet contains data or command information. As shown in FIG. 7A, data packets contain six data bits and a parity bit. As shown in FIG. 7B, a command packet contains an "OK" Flag 55 and three other flags to indicate the type of command. The three command types are CONFIGURE COMMAND, CHECK COMMAND, and UPDATE COMMAND.

Referring particularly to FIG. 3, when a packet is received at the serial input circuit 60 of an I/O module, a start bit detect circuit 62 is enabled and a timing and control circuit 63 produces a clock signal through line 64 for a receive shift register 65. The remaining bits in the packet are received and shifted into the register 65 by the clock signal. If the packet is a command packet, then the timing and control circuit 63 generates a command strobe signal 69. The command strobe 69 enables a command decoder 66, which then receives the command data from the register 65 through a bus 67. As will be described in more detail below, command packets indicate a number of different functions that are to be carried out, and the particular function is signaled to the timing and control circuit 63 through a bus 68.

The command data is also coupled through the bus 67 to an output multiplexer 70 where it is applied to the inputs of a transmit shift register 71. In response to clock pulses received from the timing and control circuit 63, the command packet is shifted out of the register 71 to the serial output circuit 61. In this manner, command packets received at the serial input circuit 60 are coupled to the serial output circuit 61 for transmission around the I/O ring 3.

Referring still to FIG. 3, when a data packet is received and shifted into the register 65, the operation of the I/O module circuitry is different. First, the contents of one of the input latches 72 or 73 or the contents of an A latch 74 is applied through the output multiplexor 70 to the transmit shift register 71. Thus, as the data packet is received, another data packet is being transmitted through the serial output circuit 61. When the data packet is totally received and its parity checked, the contents of B latch 75 are applied to the A latch 74, and the new data packet is stored in the B latch 75.

The latches 74 and 75 provide a buffer for two data packets. As the data packets for other I/O Modules on the I/O ring 3 are received, they are coupled through the B latch 75, then the A latch 74, and then transmitted through the serial output circuit 61.

The I/O module of FIG. 3 operates as follows during the I/O scan sequence. When a data packet is received at the shift register 65, the input latches 72 and 73 are clocked and the contents of input latch 72 is applied to the transmit shift register 71 for transmission around the I/O ring 3. The received data packet is applied to the B latch 75. When the next data packet is received, the contents of input latch 73 is transmitted on the I/O ring 3 and the received data packet is stored in the B latch 75 after pushing its contents to the A latch 74. As subsequent data packets are received, the contents of the A latch 74 is applied to the transmit shift register 71 and the received data packet is stored in the B latch 75, pushing its contents to the A latch 74. Shifting in this manner continues until the output data for each I/O module is contained in the respective latches 74 and 75. The output bits in the B latch 75 should then be the complements of the output bits in the A latch 74 as sent out by the processor 1.

The outputs of B latch 75 and A latch 74 are applied to a comparator 76. The comparator produces an "OK" signal 77 which is true if the contents of the B latch 75 and the A latch 74 are exact complements. The OK signal 77 is coupled back to the timing and control circuit 63 and also applied to the D input of a flip-flop 82. The flip-flop 82 is clocked by the command strobe signal 69. The inverted output of flip-flop 82 is applied to one input of a NOR gate 83, with the output of NOR gate 83 driving a fault indicator lamp 81. Thus if a command is received with the OK signal false, the flip-flop 82 is reset and the fault lamp 81 forced on.

There are three possible commands which can be received, CHECK COMMAND, UPDATE COMMAND, and CONFIGURE COMMAND. When any command is received, the timing and control circuit examines the OK signal 77 and if it is false, resets the OK Flag 55 in the command before forwarding the command to the transmit shift register. Further action taken by the I/O module in response to a command depends on the type of command received.

For a CHECK COMMAND, no further action is taken. This command is used by the processor 1 to verify valid data at each station as a precursor to sending further commands.

If the received command is an UPDATE COMMAND, then the timing and control circuit 63 again checks the OK signal 77. If the OK signal 77 is true, then the timing and control circuit 63 generates a strobe signal on line 84 to load the output latch 78 with the contents of the A latch 74. If the OK signal 77 is false, then the output latch 78 is not loaded and the processor 1 will be notified of the error via the OK Flag 55 as described above.

If the received command is a CONFIGURE COMMAND, then the data in the A latch 74 is configuration data rather than output data. Again, the timing and control circuit 63 checks the OK signal 77 to verify that the data and its complement were properly received. If the OK Signal 77 is true, then the timing and control circuit generates a strobe on a control bus 88 which causes the configuration latch and control section 89 to accept the configuration data from the A latch output bus 90.

Figure 9:
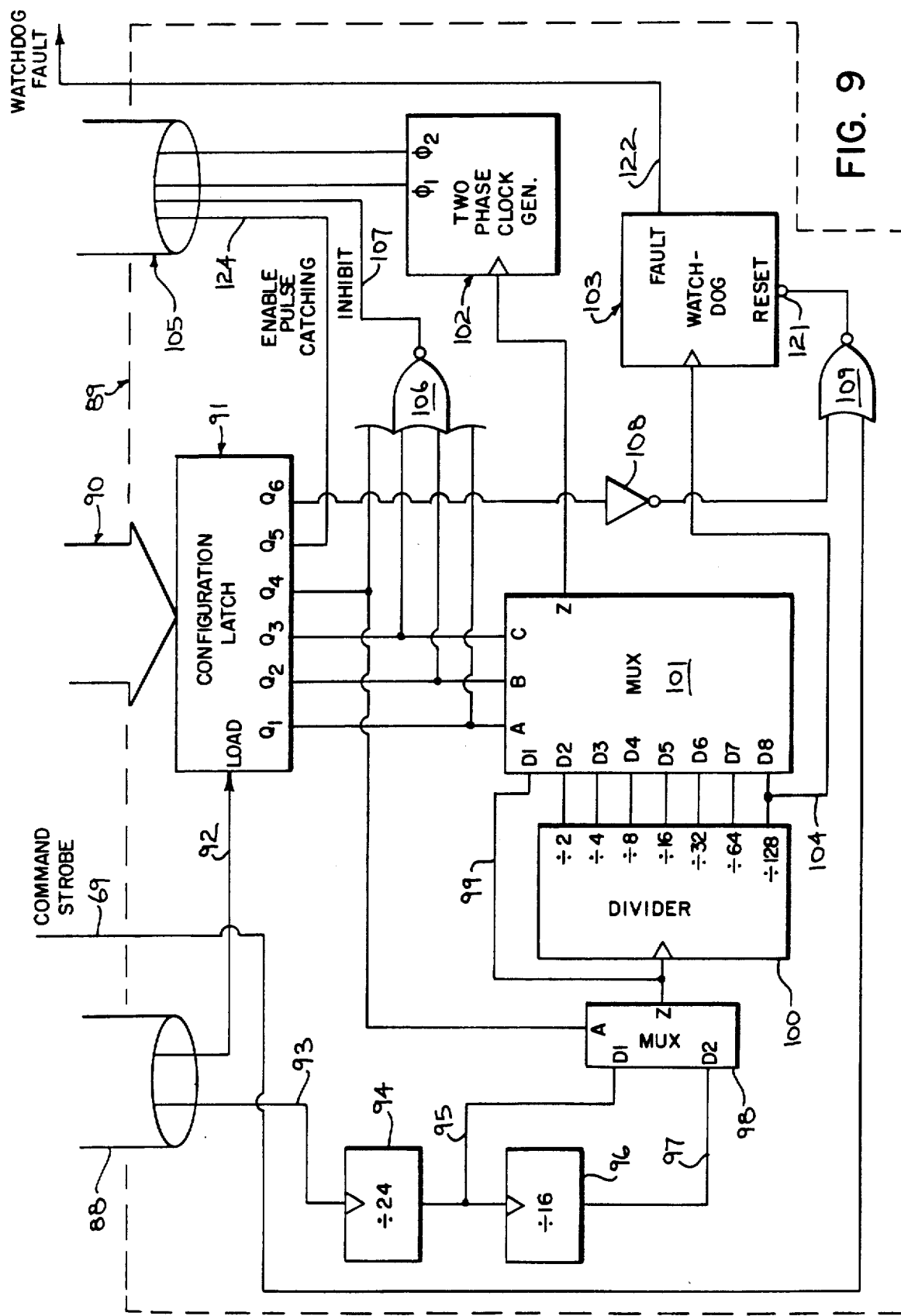
FIG. 9 is an electrical schematic diagram of the configuration latch and control curcuit of FIG. 3.

Referring to FIG. 9, the configuration latch and control section 89 includes a configuration latch 91 connected to the A latch output bus 90. As described above, when a CONFIGURE COMMAND is received, a strobe signal 92 is generated on the control bus 88 which causes the configuration latch 91 to load the data from the A latch output bus 90.

The configuration latch 91 contains 6 control bits Q1-Q6 which are used to control certain features in the I/O module. Bits Q1 through Q4 are used to control digital filtering of input lines 80 into the input filter and latch circuits 72 and 73. The bits Q1-Q4 determine the clock frequency to be used in the digital filtering thereby establishing the time constant for the filter, or alternatively if all of the bits Q1-Q4 are off can inhibit digital filtering altogether. A high frequency clock signal 93 is received over the control bus 88 from the timing and control circut 63. The high frequency clock 93 is divided by 24 by frequency divider 94 to produce an intermediate freqency on line 95. The intermediate frequency 95 is further divided by 16 by frequency divider 96 to yield a lower frequency clock 97. The intermediate frequency clock 95 and the low frequency clock 97 are connected as inputs to a multiplexer 98. The control input of multiplexer 98 is connected to bit Q4 from the configuration latch 91 and is used to select either the intermediate frequency clock 95 or the low frequency clock 97 for the multiplexer output Z. The multiplexer output 99 is connected to the clock input of a 7 stage frequency divider 100 which produces a range of sub-freqencies, each frequency representing a successive division by two. The multiplexer output frequency 99 as well as the 7 lower sub-frequencies are connected to an 8 input multiplexer 101. The control inputs for the multiplexer 101 are connected to the configuration latch bits Q1-Q3 which select which of the 8 input frequencies are passed to the output Z. The output of multiplexer 101 is connected to the clock input of a two phase clock generator which generates two phase non-overlapping clock signals $\phi 1$ and $\phi 2$. The clock signals $\phi 1$ and $\phi 2$ are connected via a configuration bus 105 to the input filter and latches 72 and 73, and are used as the clock signals for the digital filtering which is described below. Each of the four signals Q1 through Q4 of configuration latch 91 also connect to one input of NOR gate 106. The output of NOR gate 106 is an inhibit signal which causes the digital filtering circuitry to be bypassed. The inhibit signal 107 is connected to the input filter and latches 72 and 73 through the configuration bus 105.

Bit Q5 of the configuration latch 91 controls the input pulse catching feature. The input pulse catching feature insures that pulses of shorter duration than the time between successive I/O scan cycles will result in at least one change of state for the input value. Bit Q5 is connected as an enable pulse catching signal 124 which is routed to the input filter and latches 72 and 73 through the configuration bus 105.

Configuration latch bit Q6 is used to enable operation of a watchdog timer 103. The watchdog timer 103 has a clock input connected to the lowest frequency clock signal 104 of divider 100. The waterdog timer 103 will time out if eight clock pulses are received before the watchdog is reset. Configuration latch bit Q6 is connected through inverter 108 to one input of NOR gate 109, the output of which is connected to the watchdog reset input 121. If the configuration latch bit Q6 is off, then the output of NOR gate 109 is forced low and the watchdog timer 103 is held reset. If the configuration latch bit Q6 is on, the the watchdog timer 103 is enabled. The command strobe signal 69 is connected to the other input of NOR gate 109 and resets the watchdog timer 103 each time a command is received by the I/O module. As long as a command is received before eight clock cycles on line 104 have elapsed, the watchdog timer will remain reset. Configuration latch bit Q4 also affects watchdog timing by selecting one of two frequencies for the input to divider 100, thereby enabling selection of one of two time out periods for the watchdog timer. If the watchdog timer times out, then a watchdog fault signal is generated. The watchdog fault signal 122 will remain active until the watchdog timer is reset. The watchdog fault signal 122 is connected to one input of NOR gate 83 (FIG. 3) which when active causes the fault lamp 81 to be illuminated. The watchdog fault signal 122 also connects to a reset input on the output latch 78 and, when activated, causes the output latch 78 to be reset.

Referring primarily to FIG. 10, input data is received at the input filter and latches 72 and 73 on lines 80. Each input filter and latch consists of six similar stages for processing the input bits. A typical stage is shown in FIG. 10. The input line 80 connects to an input circuit 125 such as those disclosed in U.S. Pat. Nos. 3,643,115 and 4,275,307 which connect to the I/O module input terminals 9. The input circuit 125 provides a logic output 126 which indicates the state of the input. The output of the input circuit 125 is connected both to one input of a two input multiplexer 127 and to the input of a digital filter 128. The output of the digital filter 128 is connected to the other input of the multiplexer 127. Inhibit signal 107 from the configuration bus 105 is connected to the control input of the multiplexer 127. The multiplexer 127 can thereby select either the output of the input circuit 125 or the output of the digital filter 128 based on the state of the inhibit signal 107. The digital filter receives the two phase non-overlapping clock inputs $\phi 1$ and $\phi 2$. The digital filter 128 operates in well known fashion to eliminate any input pulse of shorter duration than four complete cycles of the clocks $\phi 1$ and $\phi 2$. Any change of state lasting longer than four complete cycles of the clock $\phi 1$ and $\phi 2$ is passed through the digital filter 128.

The output of multiplexer 127 is applied to the D input of a flip-flop 130. The output of flip-flop 130 is connected to the D input of the input latch 131. The clock input of input latch 131 is connected to the input strobe signal 85 which causes the current value of flip-flop 130 to be latched into the input latch 131. The output Q from the input latch 131 feeds into a bus 132 along with the corresponding outputs from other stages.

The flip-flop 130 represents the value that will become the next input value. The outputs of flip-flop 130 and the input latch 131 are connected to an exclusive-NOR gate 133, the output of which will be high if the two inputs are equal in value. The output of exclusive-NOR gate 133 is connected to one input of OR gate 134, and the output of OR gate 134 is connected to one input of AND gate 135. The other input of AND gate 135 is connected to the clock signal $\phi 2$ and the output of AND gate 135 is connected to the clock input of flip-flop 130. As long as the next input value in flip-flop 130 is equal to the current input value in the input latch 131 the output of exclusive NOR gate 133 will be high which will force a high at the output of OR gate 134, which will in turn propogate the clock signal $\phi 2$ to continuously clock new values of the input into flip-flop 130. If on the other hand, the input has changed state and the output of flip-flop 130 is not equal to the current input value in the input latch 131, then the output of exclusive-NOR gate 133 will be low. If the pulse catching enable signal 134 is high, then the output of inverter 136 will be low and the output of OR gate 134 will also be low, thereby causing a low input on AND gate 135 that prevents any further clocks from being applied to flip-flop 130. The flip-flop 130 is therefore held in the current state until the change in state is strobed into the input latch 131. If the pulse catching enabling signal 124 is low, then the outputs of inverter 136 and OR gate 134 are always high and the clock signal $\phi 2$ is always applied to the flip-flop 130 keeping it continually updated.

I claim:

1. An input/output system for an industrial control system which comprises:

a control processor having memory means for storing an input image table, an output image table, and configuration data, and having a serial output port for transmitting data packets and command packets, and having a serial input port for receiving data packets; and a plurality of I/O modules each having a serial input port and a serial output port, the I/O modules being connected in series, and the input port of the first I/O module being connected to the serial output port of the control processor and the serial output port of the last I/O module being connected to the serial input port of the control processor to form a serial I/O ring, and the serial input port of each module being selectively connected to the serial output port of that module, and wherein each I/O module includes:

(a) a temporary storage latch for storing data packets received at the serial input port of that I/O module, and for selectively sending data packets to the serial output port of that I/O module;

(b) an output latch for applying output data from a data packet received from the temporary storage latch to a set of output terminals;

(c) an input latch for selectively applying input data received at a set of I/O module input terminals to the serial output port of that module;

(d) configuration means operatively connected to the temporary storage latch for controlling the operating configuration of the I/O module, the configuration means including a configuration latch; and (e) control means operatively connected to the temporary storage latch, the output latch, the input latch, the configuration means, the serial input port and the serial output port for directing data through the I/O module whereby upon receipt of a first data packet at the serial input port, input data from the input latch is directed to the serial output port and said first data packet is directed to the temporary storage latch, and upon receipt of a next data packet consecutively after said first data packet, the contents of the temporary storage latch are directed to the serial output port and said next data packet is directed to the temporary storage latch, and upon receipt of an update command pocket at the serial input port, the contents of the temporary storage latch are directed to the output latch and the update command packet is directed to the serial output port, and upon receipt of a configure command packet at the serial input port, the contents of the temporary storage latch are directed to the configuration latch and the configure command packet is directed to the serial output port.

2. The input/output system of claim 1, in which each of said plurality of I/O modules further includes;
digital filter means connected to the input terminals for eliminating input pulses shorter than a minimum duration, said minimum duration being determined by the frequency of an input clock for the digital filter means;
multiplexer means for selectively by-passing the digital filter means;
pulse catching means connected to the output of the multiplexer means for selectively latching a change of state occuring between the last time the inputs were sampled and the next input sampling; and
the configuration means includes a control means for setting the input clock frequency to the digital filter means, selecting by-pass operation of the multiplexer, and enabling the pulse catching means, said control means operating in response to the configuration data contained in the configuration latch.

3. The input/output system as recited in claim 1 or 2 in which the control processor transmits a redundant data packet after after data packet transmitted and each I/O module includes:
a second input latch;
a second temporary storage latch for storing said redundant data packet; and
comparator means for comparing said redundant data packet in the second temporary storage latch with the data packet in the first temporary storage latch, said comparator means producing an error signal if the comparison is invalid, the error signal being coupled to said control means whereby the control means responds to the error signal by inhibiting the latching of data out of the temporary storage latch upon reception of a command packet;
wherein upon receipt of said redundant data packet the control means directs the output of the second input latch to the serial output port.

4. The input/output system as recited in claim 3 in which the I/O module control means responds to the error signal from the comparator means upon reception of a command packet by setting an error flag in the command packet before directing the command packet to the serial output port, and the control processor includes means for receiving the command packet after it has been transmitted around the I/O ring and indicating an error if the error flag in the command packet has been set.

5. A method for processing data in an industrial control I/O module which is part of an I/O communications ring for transmitting data and command packets of information comprising the steps of:
(a) receiving an input packet from the communications ring into a receive register;
(b) if the input packet is a data packet, and the data packet is the first data packet in a series of consecutive data packets, then storing the data packet in a temporary storage latch, latching input data from a set of input terminals into an input latch, and transmitting an output packet containing the contents of the input latch onto the communications ring;
(c) upon receipt of a second consecutive data packet and subsequent consecutive data packets, transmitting an output packet containing the contents of the temporary storage latch onto the communications ring and latching the data packet from the receive register into the temporary storage latch;
(d) if the input packet is an update command packet, then latching the contents of the temporary storage latch into an output latch connected to a set of output terminals and transmitting an output packet containing the update command packet from the receive register onto the communications ring;
(e) if the input packet is a configure command packet, then latching the contents of the temporary storage latch into a configuration latch for controlling the configuration of the I/O module, and transmitting an output packet containing the configure command packet from the receive register onto the communications ring.

6. An I/O module for a serial I/O communications ring comprising:
a serial input port for receiving data and command packets from the communications ring;
a temporary storage latch for storing data packets received at the serial input port of that module and for selectively sending data packets to a serial output port of that module;
an output latch for applying output data from a data packet received from the temporary storage latch to a set of output terminals;
an input latch for selectively applying input data received at a set of I/O module input terminals to the serial output port of that module; a serial output port for transmitting data and command packets onto the communications ring, the serial output port being selectively connected to either the serial input port, the temporary storage latch, or the input latch;
configuration means operatively connected to the temporary storage latch for controlling the operating configuration of the I/O module, the configuration means including a configuration latch; and
control means operatively connected to the temporary storage latch, the output latch, the input latch, the configuration means, the serial input port and the serial output port for directing data through the I/O module whereby upon receipt of a first data packet at the serial input port, input data from the input latch is directed to the serial output port and said first data packet is directed to the temporary storage latch, and upon receipt of a next data packet consecutively after said first data packet, the contents of the temporary storage latch are directed to the serial output port and said next data packet is directed to the temporary storage latch, and upon receipt of an update command packet at the serial input port, the contents of the temporary storage latch are directed to the output latch and the update command packet is directed to the serial output port, and upon receipt of a configure command packet at the serial input port, the contents of the temporary storage latch are directed to the configuration latch and the configure command packet is directed to the serial output port.

7. The I/O module of claim 6 in which the I/O module further includes;
digital filter means connected between the input terminals and the input latch for eliminating input pulses shorter than a minimum duration, said minimum duration being determined by the frequency of an input clock for the digital filter means;

multiplexer means for selectively by-passing the digital filter means;

pulse catching means connected to the output of the multiplexer means for selectively latching a change of state occurring between the last time the inputs were samples and the next input sampling; and the configuration means includes a control means for setting the input clock frequency to the digital filter means, selecting by-pass operation of the multiplexer, and enabling the pulse catching means, said control means operating in response to the configuration data contained in the configuration latch.

8. The I/O module as recited in claim 6 or 7 in which a redundant data packet follows each data packet on the I/O communications ring, and the I/O module includes:

a second input latch;

a second temporary storage latch for storing said redundant data packet; and comparator means for comparing said redundant data packet in the second temporary storage latch with the data packet in the first temporary storage latch, said comparator means producing an error signal if the comparison is invalid, the error signal being coupled to said control means whereby the control means responds to the error signal by inhibiting the latching of data out of the temporary storage latch upon reception of a command packet;

wherein upon receipt of said redundant data packet the control means directs the output of the second input latch to the serial output port.

9. The I/O module as recited in claim 8 in which the control means responds to the error signal from the comparator means upon reception of a command packet by setting an error flag in the command packet before directing the command packet to the serial output port.

* * * * *

UNITED STATES PATENT AND TRADEMARK OFFICE
CERTIFICATE OF CORRECTION

PATENT NO. : 4,750,150
DATED : June 7, 1988
INVENTOR(S) : Robert C. Weppler

It is certified that error appears in the above-identified patent and that said Letters Patent is hereby corrected as shown below:

In Column 2, at Line 24, change "commmanding" to --commanding--.
In Column 5, at Line 23, change "comamnd" to --command--;
    at Line 44, change "transmit" to --transmits--.
In Column 6, at Line 56, change "interation" to --iteration--.
In Column 7, at Line 35, change "intput" to --input--.
In Column 7, at Line 39, change "pointed" to --pointing--.
In Column 10, at Line 59, change "waterdog" to --watchdog--;
    at Line 67, change "the the" to --then the--.

Column 12, Claim 1, line 63, "pocket" to -- packet --.
Column 13, Claim 3, line 26, "after after" to -- after each --.
Column 15, Claim 7, line 7, "samples" to -- sampled --.

Signed and Sealed this

Third Day of January, 1989

Attest:

DONALD J. QUIGG

*Attesting Officer*      *Commissioner of Patents and Trademarks*